US007684329B2

(12) United States Patent
Mohanty et al.

(10) Patent No.: US 7,684,329 B2
(45) Date of Patent: Mar. 23, 2010

(54) METHOD AND APPARATUS FOR AUGMENTING PHYSICAL LAYER ARQ IN A WIRELESS DATA COMMUNICATION SYSTEM

(75) Inventors: Bibhu Mohanty, San Diego, CA (US); Eduardo Esteves, Sao Paulo (BR); Mehmet I. Gurelli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1398 days.

(21) Appl. No.: 10/140,087

(22) Filed: May 6, 2002

(65) Prior Publication Data

US 2003/0206524 A1 Nov. 6, 2003

(51) Int. Cl.
*H04L 12/26* (2006.01)
*H04L 1/18* (2006.01)
*H04J 3/16* (2006.01)

(52) U.S. Cl. .............. 370/232; 370/236; 370/468; 714/748; 714/749

(58) Field of Classification Search ............. 370/232, 370/236, 252, 394, 468, 469; 714/748, 749
See application file for complete search history.

(56) References Cited

U.S. PATENT DOCUMENTS

| 5,774,496 | A | 6/1998 | Butler et al. |
|---|---|---|---|
| 5,802,106 | A | 9/1998 | Packer |
| 5,826,172 | A | 10/1998 | Ito et al. |
| 5,835,023 | A | 11/1998 | Ito et al. |
| 5,914,950 | A | 6/1999 | Tiedemann, Jr. et al. |
| 6,111,863 | A | 8/2000 | Rostoker et al. |
| 6,307,867 | B1 | 10/2001 | Roobol et al. |
| 6,314,101 | B1 | 11/2001 | Rezaiifar et al. |

(Continued)

FOREIGN PATENT DOCUMENTS

EP       1024623 A2       8/2000

(Continued)

OTHER PUBLICATIONS

ETSI: Universal Mobile Telecommunication System (UMTS); RLC Protocol Specification (3G TS 25.322 version 3.1.2 Release 1999). XP-002168713; ETSI TS 125322, V.3.1.2, (Jan. 2000) pp. 1-47 (sections 8, 9.4-9.6, 9.7.2.-9.7.3., 11.3).

(Continued)

*Primary Examiner*—Hong Cho
(74) *Attorney, Agent, or Firm*—S. Hossain Beladi; Rupit M. Patel

(57) ABSTRACT

A system (100) and various methods and apparatus for efficient communications of data across various protocol layers are disclosed. A control and transceiver system (1400) configured for determining a data rate control (DRC) value and for transmission a maximum number of time slots allowed for transmission of a physical layer packet of data (510). After detecting a normal termination of transmission, the decoding thresholds (401, 402) are adjusted for decoding a positive acknowledgment message, and repeating decoding of acknowledgment channel (340) with the adjusted thresholds (401, 402). Retransmitting the physical layer packet of data at least one more time after based on whether the repeat of decoding of the acknowledgment channel (340) produces a negative acknowledgment message. The retransmission may be conditioned upon a throughput level of communications between the base station and the mobile station.

26 Claims, 12 Drawing Sheets

U.S. PATENT DOCUMENTS

| | | | |
|---|---|---|---|
| 6,577,630 | B1 | 6/2003 | Markwalter et al. |
| 6,671,512 | B2 | 12/2003 | Laakso |
| 6,760,860 | B1 * | 7/2004 | Fong et al. ................ 714/4 |
| 6,778,501 | B1 * | 8/2004 | Malmgren et al. .......... 370/236 |
| 6,907,005 | B1 * | 6/2005 | Dahlman et al. ............ 370/236 |
| 6,907,020 | B2 | 6/2005 | Periyalwar et al. |
| 6,917,603 | B2 | 7/2005 | Strawczynski et al. |
| 6,920,598 | B2 | 7/2005 | Chen et al. |
| 6,931,569 | B2 * | 8/2005 | Fong et al. ................ 714/18 |
| 6,999,425 | B2 | 2/2006 | Cheng et al. |
| 7,050,405 | B2 | 5/2006 | Attar et al. |
| 7,054,275 | B2 | 5/2006 | Kim et al. |
| 7,058,124 | B2 | 6/2006 | Koo |
| 7,082,107 | B1 | 7/2006 | Arvelo |
| 7,110,786 | B2 | 9/2006 | Moulsley et al. |
| 7,133,460 | B2 | 11/2006 | Bae et al. |
| 7,170,866 | B2 | 1/2007 | Lee |
| 7,437,654 | B2 | 10/2008 | Das et al. |
| 2001/0033560 | A1 | 10/2001 | Tong et al. |
| 2002/0018446 | A1 * | 2/2002 | Huh et al. ................ 370/245 |
| 2002/0027956 | A1 * | 3/2002 | Lee et al. ................ 375/262 |
| 2002/0146980 | A1 * | 10/2002 | Solondz et al. ............... 455/21 |
| 2002/0150040 | A1 | 10/2002 | Tong et al. |
| 2002/0172217 | A1 * | 11/2002 | Kadaba et al. .............. 370/443 |
| 2003/0072296 | A1 | 4/2003 | Odenwalder et al. |
| 2003/0112780 | A1 * | 6/2003 | Ouyang et al. .............. 370/338 |
| 2004/0141523 | A1 | 7/2004 | Bhushan et al. |
| 2004/0141525 | A1 | 7/2004 | Bhushan et al. |
| 2005/0058154 | A1 | 3/2005 | Lee et al. |
| 2005/0237994 | A1 * | 10/2005 | Fong et al. ................ 370/349 |

FOREIGN PATENT DOCUMENTS

| | | |
|---|---|---|
| GB | 2332343 A | 6/1999 |
| JP | 2001-094574 | 4/2001 |
| RU | 2316132 | 1/2008 |
| WO | 0209342 | 1/2002 |
| WO | 02001743 | 1/2002 |
| WO | 03043218 | 5/2003 |

OTHER PUBLICATIONS

ISR-PCT-US03/14082-11/20/03-ISR-EPO.

International Search Report PCT/US03/014082, International Search Authority European Patent office, Nov. 20, 2003.

Attar et al., "A Reverse Link Outer-Loop Power Control Algorithm for CDMA2000 1xEV Systems," IEEE International Conference on Communications, 2002. ICC 2002. vol. 1, Apr. 28 - May 2, 2002, pp. 573-578.

Chakravarty et al., "An Algorithm for Reverse Traffic Channel Rate Control for CDMA2000 High Rate Packet Data Systems,"; IEEE Global Telecommunications Conference, 2001. GLOBECOM '01. vol. 6, Nov. 25-29, 2001, pp. 3733-3737.

Esteves, E., "On the Reverse Link Capacity of CDMA2000 High Rate Packet Data Systems," IEEE International Conference on Communications, 2002. vol. 3, Apr. 28 - May 2, 2002, pp. 1823-1828.

International Preliminary Report on Patentability - PCT/US03/014082, IPEA, US - Feb. 6, 2006.

European Search Report, EP07006365 - Search Authority - Munich Patent Office, May 23, 2007.

* cited by examiner

| DRC VALUE | RATE (kbps) | PACKET LENGTH (SLOTS) |
|---|---|---|
| 0x0 | NULL RATE | N/A |
| 0x1 | 38.4 | 16 |
| 0x2 | 76.8 | 8 |
| 0x3 | 153.6 | 4 |
| 0x4 | 307.2 | 2 |
| 0x5 | 307.2 | 4 |
| 0x6 | 614.4 | 1 |
| 0x7 | 614.4 | 2 |
| 0x8 | 921.6 | 2 |
| 0x9 | 1228.8 | 1 |
| 0xa | 1228.8 | 2 |
| 0xb | 1843.2 | 1 |
| 0xc | 2457.6 | 1 |
| 0xd | INVALID | N/A |
| 0xe | INVALID | N/A |
| 0xf | INVALID | N/A |

FIG. 6

METHOD AND APPARATUS FOR AUGMENTING PHYSICAL LAYER ARQ IN A WIRELESS DATA COMMUNICATION SYSTEM

FIELD

The present invention relates generally to the field of data communications, and more particularly, to wireless data communications.

BACKGROUND

In a data communication system, particularly a wireless data communication system, packets of data may be lost for various reasons, including poor channel conditions. The data communicated between two end users may pass through several layers of protocols for assuring proper flow of data through the system, where each layer adds certain functionality to the delivery of the data packet from a source user to a destination user. The proper delivery of data in at least one aspect is assured through a system of checking for error in each packet of data, and automatically requesting a retransmission of the same packet of data (ARQ mechanism), if an error is detected in the received packet of data. Independent ARQ mechanisms may be employed at different protocol layers for flowing data between corresponding end users. The data packets are sequentially delivered from one protocol layer to another. The sequential delivery is performed by transferring a group of data packets at a time in a series of packets of data from one protocol layer to another. A group of data packets may not be transferred until the process for retransmission of the erased packets of data in the group in the lower protocol layer has been completed. The retransmission request for retransmitting an erased packet of data may be repeated several times or the retransmission may take several times until the erased packet of data is received correctly at the destination. As a result, the retransmission process at one protocol layer may slow down the flow of data between different protocol layers in the system. In the mean time, the higher layer protocol may prematurely request for retransmission of all the packets of data in the group including those received successfully at the lower layer, resulting in a very inefficient use of communication resources when flow of data from one protocol layer to another is slow. As such, minimizing the lower layer packet losses due to erasures over the air link is important as much as minimizing the delay of multiple retransmissions, in the event of a packet loss. Therefore, there is a tradeoff between the number of retransmission attempts by a lower layer protocol layer and the delay resulting from such retransmissions that must be considered in the ARQ mechanisms for end-to-end delivery of data packets.

To this end as well as others, there is a need for a method and apparatus to efficiently control flow of data in a communication system.

SUMMARY

A system and various methods and apparatus for efficient communications of data across various protocol layers are disclosed. A control and transceiver system are configured for determining a data rate control (DRC) value and for determining a maximum number of time slots allowed for transmission of a physical layer packet of data. After detecting a normal termination of transmission, the decoding thresholds are adjusted for decoding a positive acknowledgment message, and repeating decoding of the acknowledgment channel with the adjusted thresholds. Retransmitting the physical layer packet of data at least one more time is based on whether the repeat of decoding the acknowledgment channel produces a negative acknowledgment message. The retransmission may be conditioned upon a throughput level of communications between the base station and the mobile station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 6 illustrates a table for selecting a maximum number of allowed transmission slots for communication of a packet of data at a selected data rate;

DETAILED DESCRIPTION OF THE PREFERRED EMBODIMENT(S)

Generally stated, various aspects of the invention provide for efficient use of communication resources in a communication system by efficiently determining the need for one more transmission of a physical layer data packet on the forward link based on repeating the decoding of the previously received signal of the acknowledgment channel. Repeating the decoding process may involve use of different decoding thresholds. Subsequently, the retransmission of the physical layer packet may include use of temporal diversity. Various techniques of temporal transmission diversity are well known. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the 3GPP web site (at www.3gpp2.org), or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
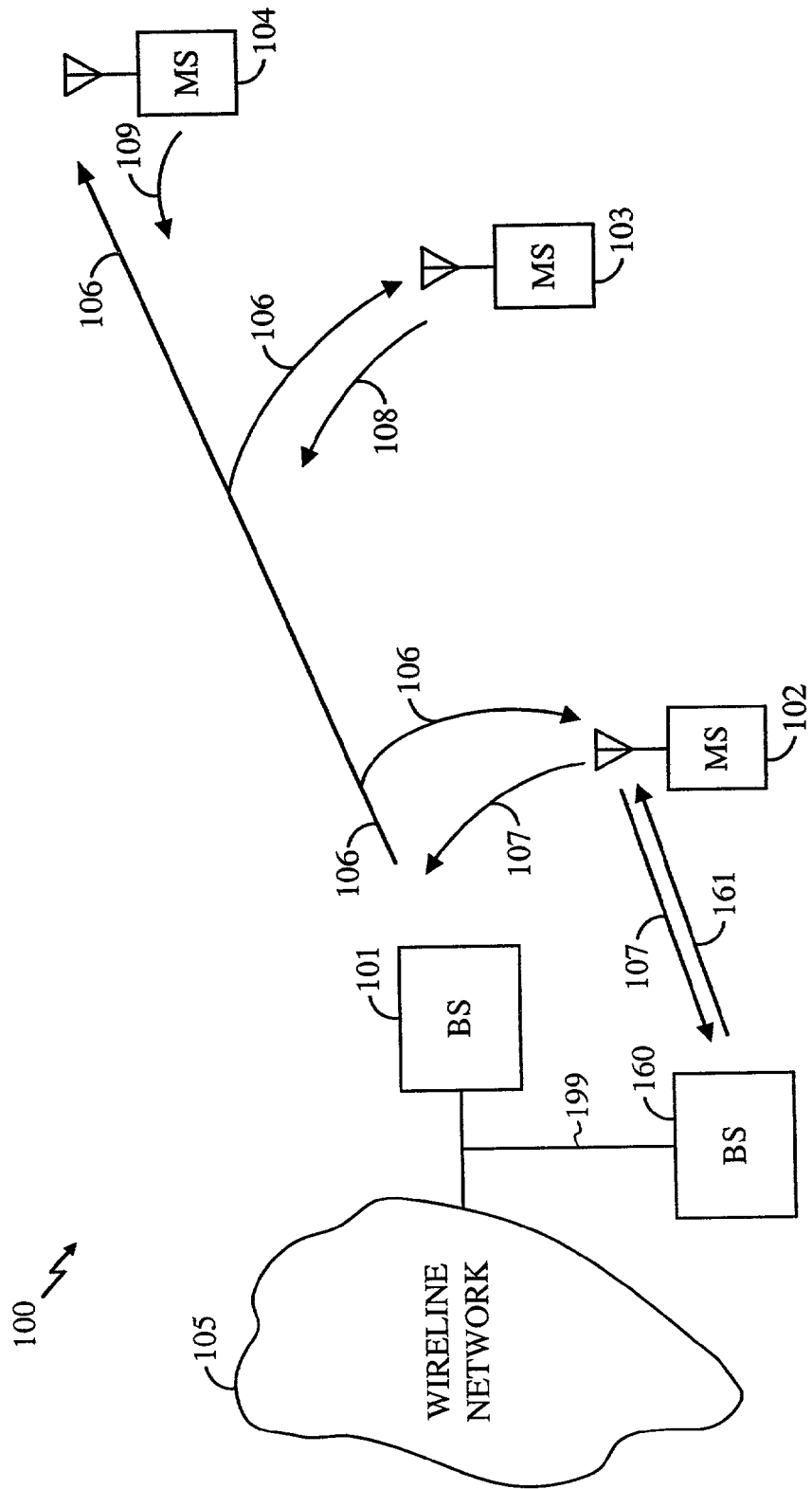
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of data, or data and voice. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to communications over a back-haul 199 between network 105 and base stations 101 and 160. Base station 101 communicates with each mobile station that is in its coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the received information. Base station 160 may also communicate with the mobile stations that are in its coverage area via a forward link signal transmitted from base station 160. Mobile stations 102-104 communicate with base stations 101 and 160 via corresponding reverse links. Each reverse link is maintained by a reverse link signal, such as reverse link signals 107-109 for mobile stations 102-104, respectively. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station. The reverse link channel condition may not be the same as the forward link channel condition. The data rate and power level of the reverse link and forward link may be different. One ordinary skilled in the art may recognize that the amount of data communicated in a period of time varies in accordance with the communication data rate. A receiver may receive more data at high data rate than low data rate during the same period of time. Moreover, the rate of communications between the users may also change. A receiver may receive more data at high rate of communications than low rate of communications during the same period of time. Moreover, when communication of a packet of data takes more than one transmission, the effective amount of data communicated over a period of time is reduced. Therefore, the throughput of the communication between a mobile station and a base station may change from time to time based on the channel condition. In accordance with one or more aspects of the invention, efficient use of communication resources in communication system 100 may be made by determining the need for one more retransmission of a physical layer data packet, after being detected as a lost data packet, based on the throughput of the communication between the base station and the mobile station.

In accordance with various aspects of the invention, in communication system 100, re-transmitting a lost packet of data at least one more time after detecting its loss is based on whether a determined throughput of a communication link between a source user and a destination user is above a throughput threshold. The source user may be a base station, such as base station 101 or 160, and the destination user may be any of the mobile stations 102-104. After establishing a forward link communication, loss of the packet of data may be detected by the mobile station. The throughput of the forward link communication may be determined in terms of the communication data rate, rate of communications, number of retransmissions used between the source user and the destination user, or any combination thereof. The retransmission may include use of transmission diversity. Moreover, the reception of the retransmission may include receive diversity. When the throughput is above the threshold, the possibility of receiving the lost packet of data through the retransmission is higher due to a favorable throughput channel condition. Therefore, when the retransmission does not take place due to failure of the throughput for being above the threshold, the communication resources are conserved by being used efficiently. Moreover, when the retransmission takes place, the delay in flow of data among various protocol layers is minimized by providing a timely successful reception of the lost packet of data during favorable throughput channel condition.

Figure 2:
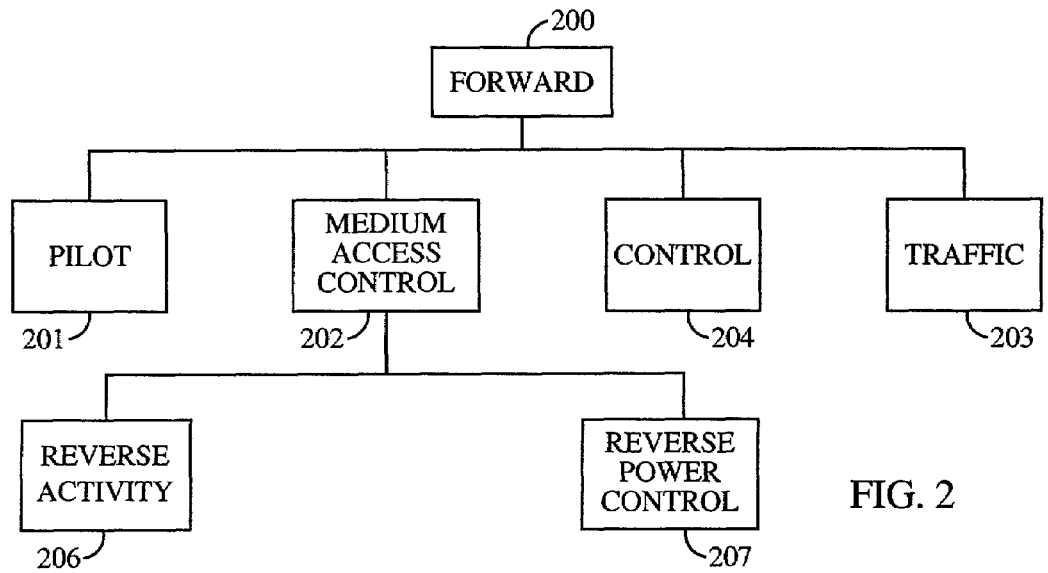
FIG. 2 illustrates the forward link channel structure in a wireless data communication system.

FIG. 2 illustrates a forward channel structure 200 in accordance with an embodiment that may be used for the channel structure of the communications on the forward link. Forward channel structure 200 may include a pilot channel 201, a medium access control (MAC) channel 202, a traffic channel 203 and a control channel 204. The MAC channel 202 may include a reverse activity channel 206 and a reverse power control channel 207. Reverse activity channel 206 is used to indicate the activity level on the reverse link. Reverse power control channel 207 is used to control the power at which a mobile station can transmit on the reverse link.

Figure 3:
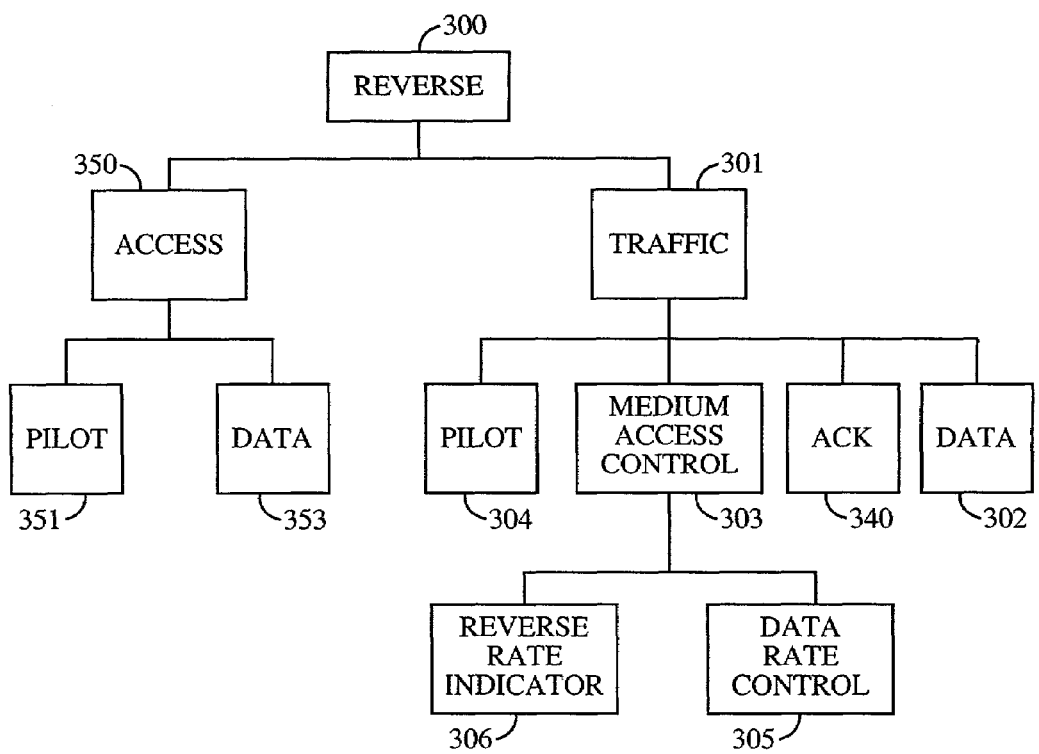
FIG. 3 illustrates the reverse link channel structure in a wireless data communication system.

FIG. 3 illustrates, in accordance with an embodiment, a reverse channel structure 300 that may be used for the channel structure of the communications on the reverse link. Reverse channel structure 300 includes an access channel 350 and a traffic channel 301. Access channel 350 includes a pilot channel 351 and a data channel 353. Traffic channel 301 includes a pilot channel 304, a MAC channel 303, an acknowledgment (ACK) channel 340 and a data channel 302. The MAC channel 303 includes a reverse link data rate indicator channel 306 and a data rate control channel (DRC) 305. Reverse rate indicator channel 306 is used for indicating the rate at which a mobile station is currently transmitting. Data rate control (DRC) channel 305 indicates a data rate that a mobile station is capable of receiving on the forward link. For example, the DRC value 0×3 may indicate the data rate 153.6 kbps. Moreover, the system may require a predefined and limited number of retransmissions of a physical layer packet of data that possibly can take place. For example, at the data rate 153.6 kbps, the system allows up to 3 retransmissions of the same packet of data after the initial transmission, resulting in a total of four transmissions. If the physical layer packet of data is not decoded properly after the initial transmission, as indicated by the ACK channel 340 in the reverse link, the transmitter may send the same packet of data one more time. The retransmission may continue up to three times. The transmitter does not transmit the same packet of data more than four times, one initial time and three retransmissions, when the data rate is at 153.6 kbps. ACK channel 340 is used for communicating whether a received physical layer data packet has been decoded successfully at a mobile station. When a packet of data is lost, even after the maximum allowed retransmissions, in accordance with various aspects of the invention, in communication system 100, re-transmitting the lost packet of data at least one more time may be based on whether a determined throughput of the communication link between the mobile station and serving base station is above a throughput threshold.

ACK channel 340 is transmitted by a mobile station. Transmission on ACK channel 340 may indicate either a negative acknowledgment (NAK) or a positive acknowledgement (ACK). The mobile station may transmit a NAK message as indicated by a single NAK bit to the serving base station until a received physical layer data packet is successfully decoded. The physical layer data packet may be successfully decoded before the maximum number of allowed retransmissions. If a received packet of data is correctly decoded, the mobile station sends an ACK message as indicated by a single ACK bit on the ACK channel 340 to the serving base station. The ACK channel 340 may use a binary phase shift keying (BPSK) modulation transmitting a positive modulation symbol for a positive acknowledgment and a negative modulation symbol for a negative acknowledgment. In a transmitter described in IS-856 standard, the ACK/NAK bit passes and repeats through a BPSK modulator. The BPSK modulator modulates the ACK/NAK bit, and the resulting signal is Walsh covered in accordance with an assigned Walsh code. In one embodiment, the received signal of the ACK channel 340 may be compared against a positive and negative voltage threshold. If the received signal level meets the positive voltage threshold, an ACK message is considered received on the ACK channel 340. If the signal level meets the negative voltage threshold, a NAK message is considered received on the ACK channel 340.

Figure 4:
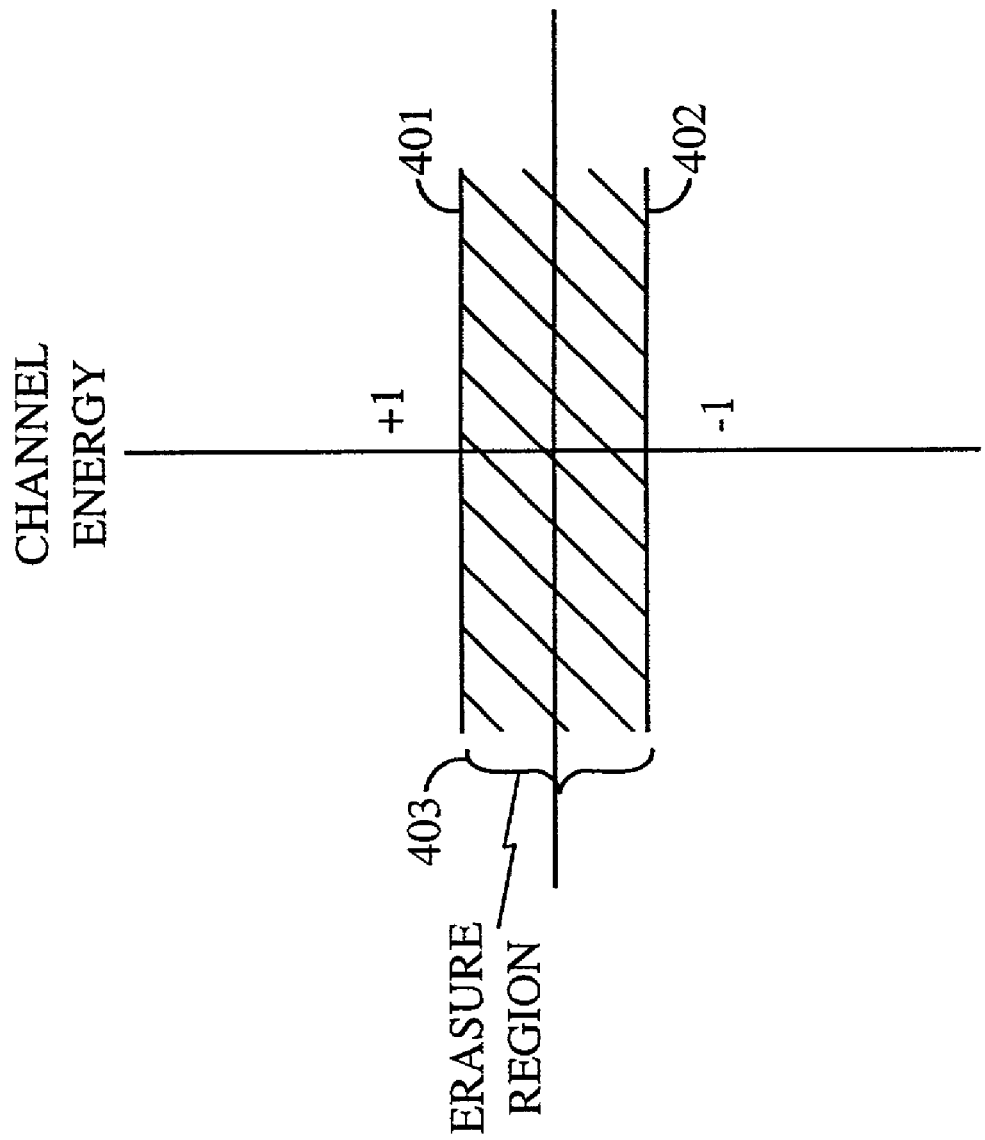
FIG. 4 illustrates decoding of an acknowledgment channel data bit in accordance with various received energy thresholds.

Referring to FIG. 4, decoding of ACK channel 340 may be illustrated. The resulting signal may be compared against a positive threshold 401 and a negative threshold 402. If the signal is above the positive threshold 401, an ACK bit is considered received on the ACK channel 340. If the signal is below the negative threshold 402, an NAK bit is considered received on the ACK channel 340. The positive and negative thresholds 401 and 402 may not be at the same level. As such, an erasure region 403 may be created between the positive and negative thresholds 401 and 402. If the resulting demodulated signal falls in the erasure region 403, the receiving base station may not be able to determine whether an ACK or NAK bit has been transmitted from the mobile station on ACK channel 340.

The ARQ mechanism may have a few problems when the received ACK channel 340 signal is in the erasure region 403. If the erasure is interpreted as an ACK, when in fact a NAK is transmitted from the mobile station, the base station stops transmitting the remaining number of allowed retransmissions of the physical layer data packet. As a result, the mobile station would not receive the physical layer packet of data and may rely on a retransmission mechanism of a higher level protocol layer, such as a radio link protocol (RLP) layer, to recover the lost packet of data. However, the delay in receiving the packet of data and utilization of the communication resources are higher at the RLP layer than the physical protocol layer. One of the measured system qualities may be the certainty associated with proper and on time delivery of a data packet to a mobile station. To avoid such a problem, in one embodiment, the process of decoding the ACK channel may be biased toward detecting a NAK by interpreting an erasure as a NAK. If the mobile station in fact has transmitted an ACK and the serving base station detects an erasure, interpreting the erasure as a NAK allows the base station to continue the transmission of the physical layer data packet for at least one more time of the remaining number of times, when in fact any retransmission of the data packet is not necessary. Such a retransmission, even though may not be necessary, in fact may achieve efficient use of the communication resources with minimal delay for delivery of data packets.

In accordance with various aspects of the invention, after failing to properly receive the physical packet of data after the last allowed retransmission, the thresholds 401 and 402 may be changed that reduces detection of an erasure. After changing at least one of the thresholds, the previously received signal of the ACK channel 340 may be re-examined to determine if an ACK message may be detected. If still a NAK is detected, one more retransmission of the physical layer data packet is attempted beyond the maximum allowed number of retransmissions. One ordinary skilled in the art may appreciate that a retransmission may involve multiple time slots depending on the data rate requested by the mobile station similar to the original transmission. Before the extra retransmission is attempted, the data rate request message may be determined anew based on the most recently received data. The number of slots used in the extra retransmission may be different based on the most recently received data.

Figure 5:
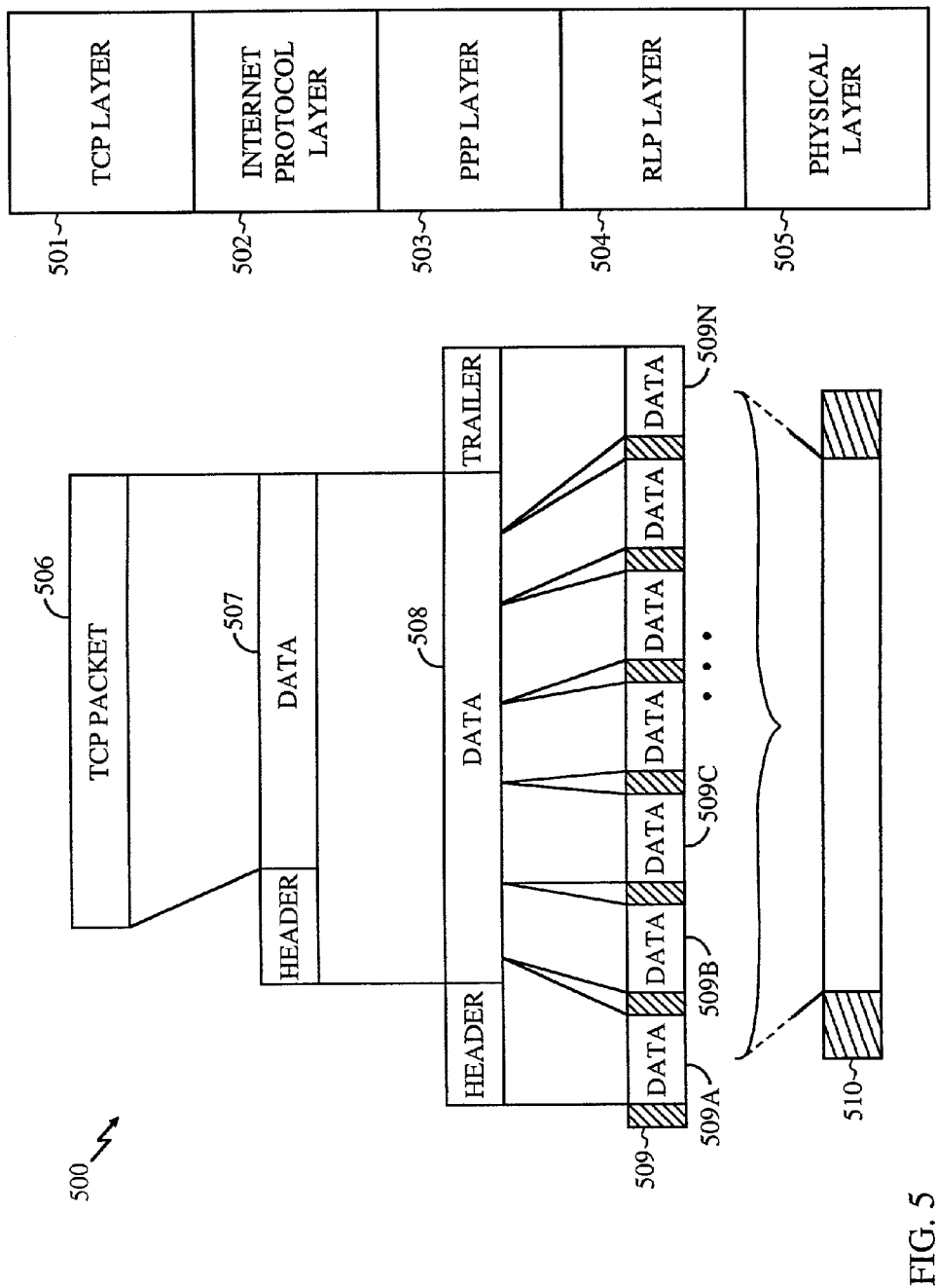
FIG. 5 illustrates a stack of protocol layers for controlling flow of data in a communication system.

The flow of data between two end points may be controlled via several protocol layers. An exemplary stack of the protocol layers 500 is shown in FIG. 5 for controlling flow of data between two end points. For example, one end point may be a source connected to internet through the network 105. The other end point may be a data processing unit such as a computer coupled to a mobile station or integrated in a mobile station. The protocol layers 500 may have several other layers or each layer may have several sub-layers. A detailed stack of protocol layers is not shown for simplicity. The stack of protocol layers 500 may be followed for flow of data in a data connection from one end point to another. At the top layer, a TCP layer 501 controls the TCP packets 506. TCP packets 506 may be generated from a much larger application data message/packet. The application data may be partitioned into several TCP packets 506. The application data may include text message data, video data, picture data or voice data. The size of the TCP packets 506 may be different at different times. At the Internet Protocol layer (IP) layer 502, a header is added to the TCP packets 506 to produce data packet 507. The header may include a destination address, among other fields, for proper routing of the packets to the appropriate destination node. At a point-to-point protocol (PPP) layer 503, PPP header and trailer data are added to data packet 507 to produce data packet 508. The PPP data may identify the point-to-point connection addresses for proper routing of a packet of data from a source connection point to a destination connection point. The PPP layer 503 may pass data for more than one TCP layer protocol connected to different ports.

A radio link protocol (RLP) layer 504 provides a mechanism for retransmission and recovery of data packets erased over the air. Although TCP has a retransmission scheme for reliable data transfer, the rate of losing packets of data over the air may result in overall poor TCP performance. Implementing an RLP mechanism at a lower layer effectively lowers the rate of losing TCP packets at the TCP level. At RLP layer 504, the data packet 508 is divided into several RLP packets in a group of RLP packets 509A-N. Each RLP packet of the group of the RLP packets 509A-N is processed independently and assigned a sequence number. The sequence number is added to the data in each RLP packet for identifying the RLP packet among the RLP packets in the group of the RLP packets 509A-N. One or more of the RLP packets in the group of the RLP packets 509A-N is placed into a physical layer packet of data 510. A physical layer 505 controls the channel structure, frequency, power output, and modulation specification for data packet 510. The data packet 510 is transmitted over the air. The size of the payload of the packet of data 510 may vary depending on the rate of transmission. Therefore, the size of data packet 510 may be different from time to time based on the channel condition and the selected communication data rate.

On a receiving destination, the physical layer data packet 510 is received and processed. The ACK channel 340 may be used for acknowledging success/failure in reception of physical layer data packet 510 transmitted from a base station to a mobile station. If the physical layer data packet 510 is received without error, the received packet 510 is passed on to RLP layer 504. The RLP layer 504 attempts to reassemble the RLP packets in the group of the RLP packets 509A-N from the received packets of data. In order to reduce the packet error rate seen by TCP 501, the RLP layer 504 implements an automatic retransmission request (ARQ) mechanism by requesting retransmission for the missing RLP packets. The RLP protocol re-assembles the group of the RLP packets 509A-N to form a complete PPP packet 508. The process may take some time to completely receive all the RLP packets in the group of the RLP packets 509A-N. Several physical layer data packets 510 may be needed to completely send all the RLP packets in the group of the RLP packets 509A-N. When an RLP packet of data is received out of sequence, the RLP layer 504 sends an RLP negative acknowledgement (NAK) message on a signaling channel to the transmitting base station. In response, the transmitting base station retransmits the missing RLP data packet.

Referring to FIG. 6, a table 600 depicts the DRC value of the DRC channel 305, the corresponding data rate, and the corresponding maximum number of allowed transmissions of a physical layer packet of data. For example, for the DRC value 0×3, the data rate is 153.6 kbps and the corresponding maximum number of allowed transmissions is four time slots. Transmission of a physical layer packet of data may have an early termination or a normal termination. With early termination, the physical layer packet of data has been decoded properly at the receiver and the transmitting source has received an ACK message on the ACK channel 340 corresponding to the received physical layer packet of data. With normal termination, the transmitter has exhausted using all the allowed transmissions slots of the physical layer packet of data without receiving a corresponding ACK message on the ACK channel 340.

Figure 7:
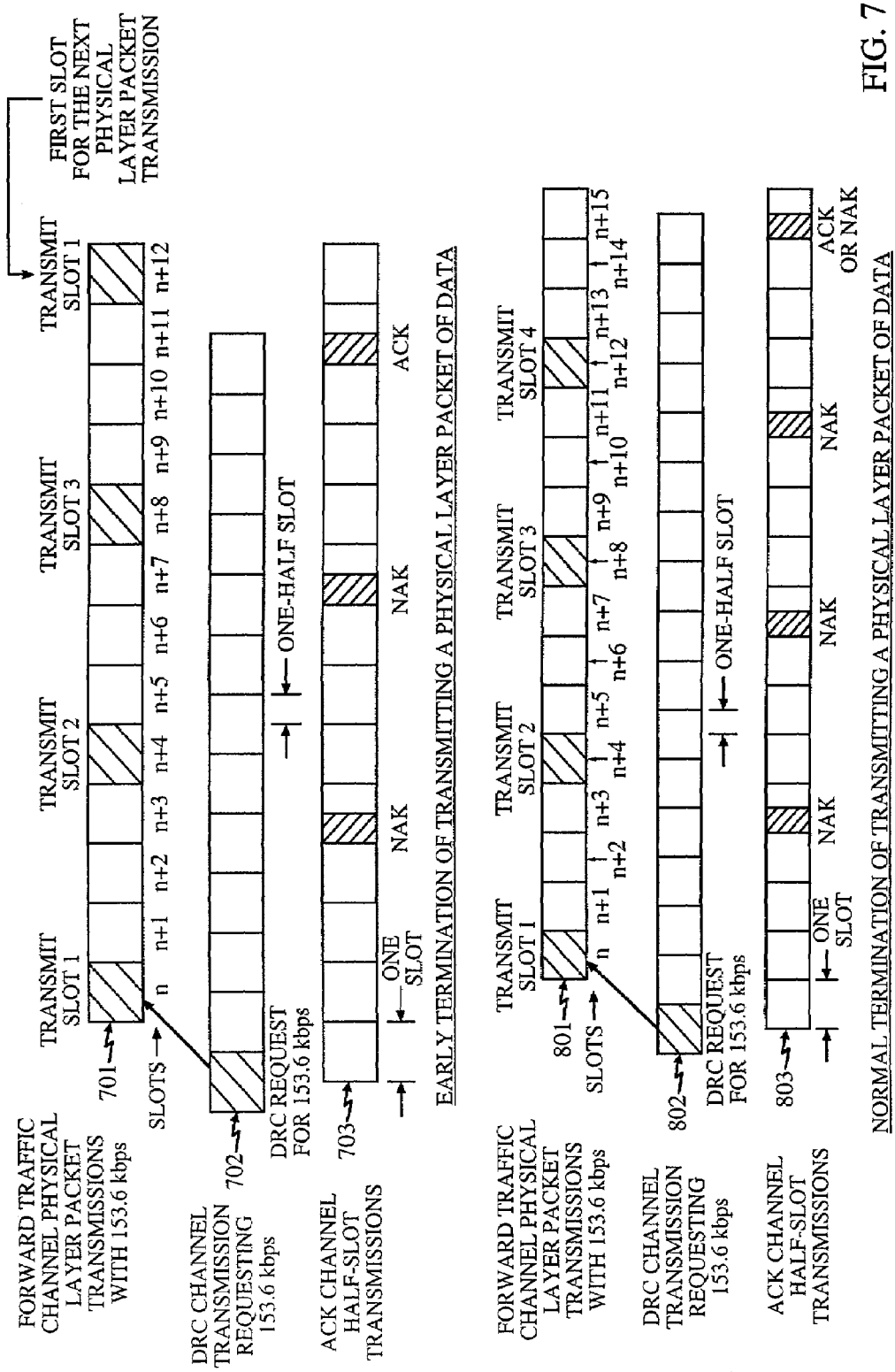
FIG. 7 illustrates early and normal terminations of transmitting a packet of data at the physical layer.

Referring to FIG. 7, an early termination and normal termination of transmitting a physical layer packet of data are illustrated for the case of DRC value 0×3 corresponding to 153.6 kbps data rate. For an early termination of transmitting a physical layer packet of data for the case of DRC value 0×3 corresponding to 153.6 kbps data rate, at a time slot 702 prior to the first transmission of the physical layer packet of data, a DRC value is received on the DRC channel 305. The DRC value is used to determine the communication data rate and the maximum number of allowed retransmissions for the physical layer packet of data. At time slot "n" of the time slots 701, the first transmission of the physical layer packet of data may take place. During the next three time slots, "n+1, n+2, and n+3", the transmitter expects to receive an ACK or NAK on the ACK channel 340. Time slots 703 show that a NAK is received before the time slot "n+4". The first retransmission of the physical layer packet of data takes place during the time slot "n+4". The transmitter waits three more time slots to receive an ACK or NAK on the ACK channel 340. Time slots 703 show that a NAK is received before the time slot "n+8". The second retransmission of the physical layer packet of data takes place during the time slot "n+8". For data rate 153.6 kbps, the transmitter is allowed to make one more transmission of the same physical layer packet of data. The transmitter waits three more time slots to receive an ACK or NAK message on the ACK channel 340. Before the time slot "n+12", an ACK message is received on the ACK channel 340. Therefore, the transmitter makes an early termination of the transmission of the physical layer packet of data before exhausting all the allowed transmission slots. The time slot "n+12" may be used for transmission of another physical layer packet of data.

For a normal termination of transmitting a physical layer packet of data for the case of DRC value 0×3 corresponding to 153.6 kbps data rate, at a time slot 802 prior to the first transmission of the physical layer packet of data, a DRC value is received on the DRC channel 305. The DRC value is used to determine the communication data rate and the maximum number of allowed retransmissions for the physical layer packet of data. At time slot "n" of the time slots 801, the first transmission of the physical layer packet of data may take place. During the next three time slots, "n+1, n+2, and n+3", the transmitter expects to receive an ACK or NAK on the ACK channel 340. Time slots 803 may show that a NAK is received before the time slot "n+4". The first retransmission of the physical layer packet of data takes place during the time slot "n+4". The transmitter waits three more time slots to receive an ACK or NAK on the ACK channel 340. Time slots 803 may show that a NAK is received before the time slot "n+8". The second retransmission of the physical layer packet of data takes place during the time slot "n+8". For data rate 153.6 kbps, the transmitter is allowed to make one more transmission of the same physical layer packet of data. The transmitter waits three more time slots to receive an ACK or NAK on the ACK channel 340. Before the time slot "n+12", a NAK message is received on the ACK channel 340. Therefore, the transmitter makes the last allowed transmission of the physical layer packet of data on the time slot "n+12", and concludes the normal termination of transmitting the physical layer packet of data after exhausting all the allowed transmissions of the physical layer packet of data.

Generally, the transmitter is not required to monitor the ACK channel 340 for detecting whether the last transmission has been received in either success or failure. The physical layer packet may not be successfully received at the mobile station following a normal termination. In this case, the re-assembly of RLP packets of data at the RLP layer 504 would not be complete. As a result, the RLP layer 504 makes a request for retransmission of the RLP packet of data by sending an RLP NAK signaling message. In accordance with various aspects of the invention, after a normal termination of transmission of a physical layer packet of data, the base station may monitor the ACK channel 340 and if a NAK is received, it may repeat decoding the previously received signal of ACK channel 340 with adjusted ACK/NAK thresholds 401 and 402. The adjustments of the ACK/NAK thresholds 401 and 402 are made such that the decoding is biased toward detection of an ACK message. Such a bias may be created by treating the erasures as ACKs without changing the level of the NAK threshold 402 from the previously used level or by selecting a different threshold altogether.

Figure 8:
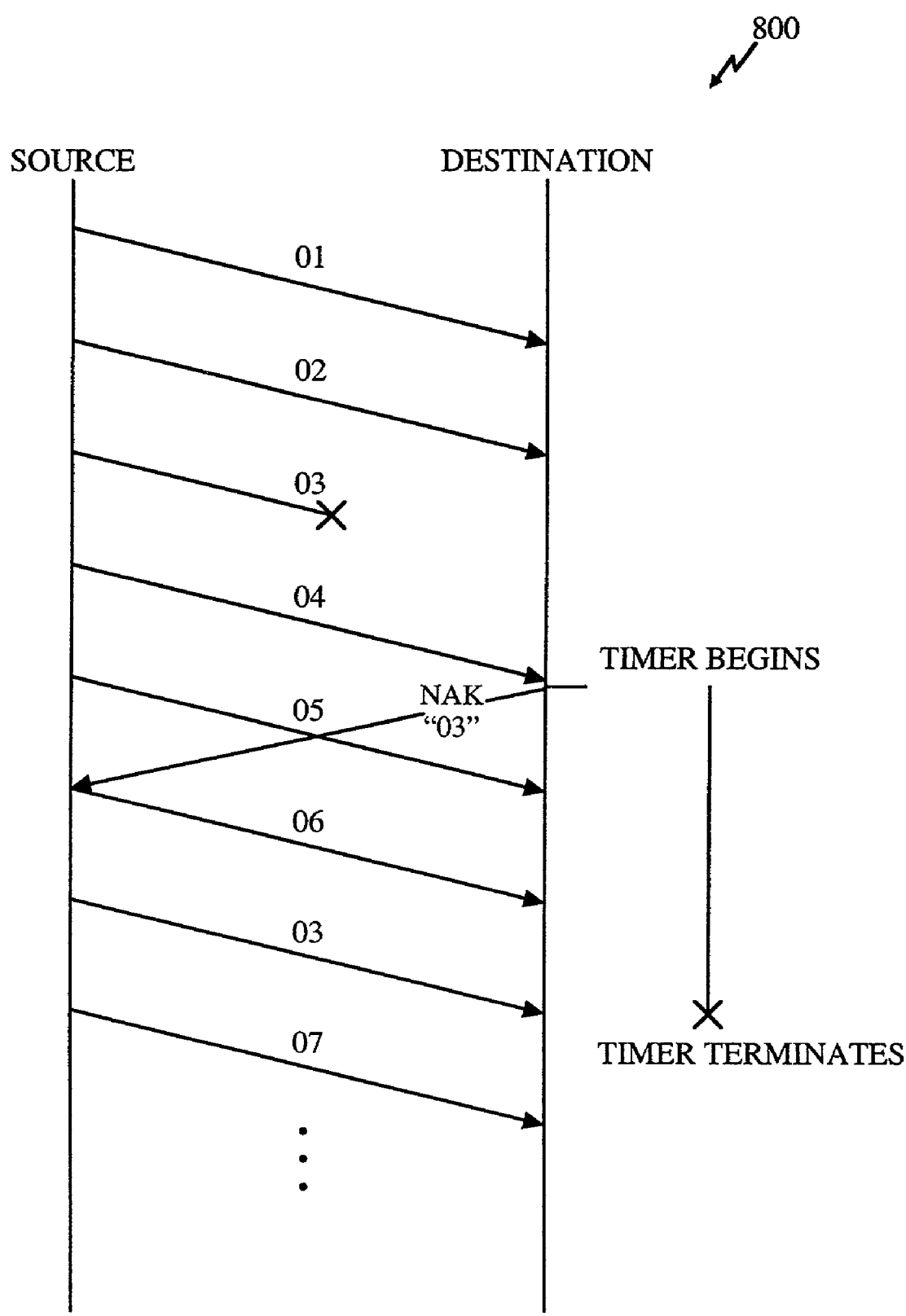
FIG. 8 illustrates an exemplary flow of radio link protocol layer packets of data.

Generally, ARQ mechanism through the RLP layer takes some time, which includes the round trip delay between the mobile station and the base station as well as the processing delays. Referring to FIG. 8, a message flow 800 is shown to provide an exemplary flow of RLP packets of data. The RLP packets with sequence numbers "01" to "07" are sent from a source to a destination, for example. The source and destination may be, respectively, either a base station and a mobile station or a mobile station and a base station. At the RLP layer 504, the RLP packets 509A-N are accumulated to complete the packet 508. Once all the RLP packets are received, the RLP packets 509A-N are passed on to a higher level. At the physical layer 505, the communication of the physical layer data packet 510 also includes an ARQ method through the use of the ACK channel 340. One or more RLP packets may be combined into a common payload and sent on one physical layer data packet 510. In the exemplary message flow 800, the RLP packet identified as RLP packet "03", for example, does not get to the destination. The failure may be due to many factors including erasure on the radio link between the source and the destination. In this case, the normal termination of transmitting the physical layer packet of data that includes the RLP packet of data "03" may have taken place. After the destination receives RLP packet "04", the RLP layer 504 detects an out of sequence reception of the RLP packets. The RLP layer 504 sends an RLP NAK message identifying RLP packet "03" as missing in the communication. The processing for detection of a missing RLP packet of data, the propagation of the RLP NAK message, and the subsequent RLP retransmission may take some time. The duration may be long enough to allow one quick retransmission of the physical layer of packet of data, beyond the maximum allowed number of retransmissions, for an earlier recovery. If this additional retransmission, in accordance with various aspects of the invention, is successful before transmitting an RLP NAK message, the RLP NAK message may not be transmitted.

If the RLP NAK message is transmitted, at the same time RLP layer 504 begins a timer. The timer counts the lapsed amount of time after sending the RLP NAK message. If the timer expires, for example after 500 mSec, before receiving the missing RLP packet "03", the destination RLP 504 may assume that the retransmission of the missing RLP packet has failed. Once the missing RLP packet "03" is received, the timer terminates. The correctly received packets of data may be collected in a storage unit to form a group of packets of data. Therefore, the processing for detection and retransmission of a missing RLP packet of data may take some time. The duration may be sufficiently long enough to allow one more retransmission of the physical layer of packet of data beyond the maximum allowed number of retransmissions. If this additional retransmission, in accordance with various aspects of the invention, is successful before expiration of the timer, the timer may terminate due to receiving the retransmission of the physical layer packet of data successfully. It is possible that the RLP NAK message was sent before the extra physical layer retransmission was successfully received. In such a case either the base station may choose to ignore the received RLP NAK message or it may perform the RLP retransmission of the missing packet, which will be discarded as a duplicate at the mobile station. It is possible that the extra physical layer retransmission may end in a failed normal termination. In this case, the usual RLP retransmission mechanism may provide the recovery of the lost packet.

Figure 9:
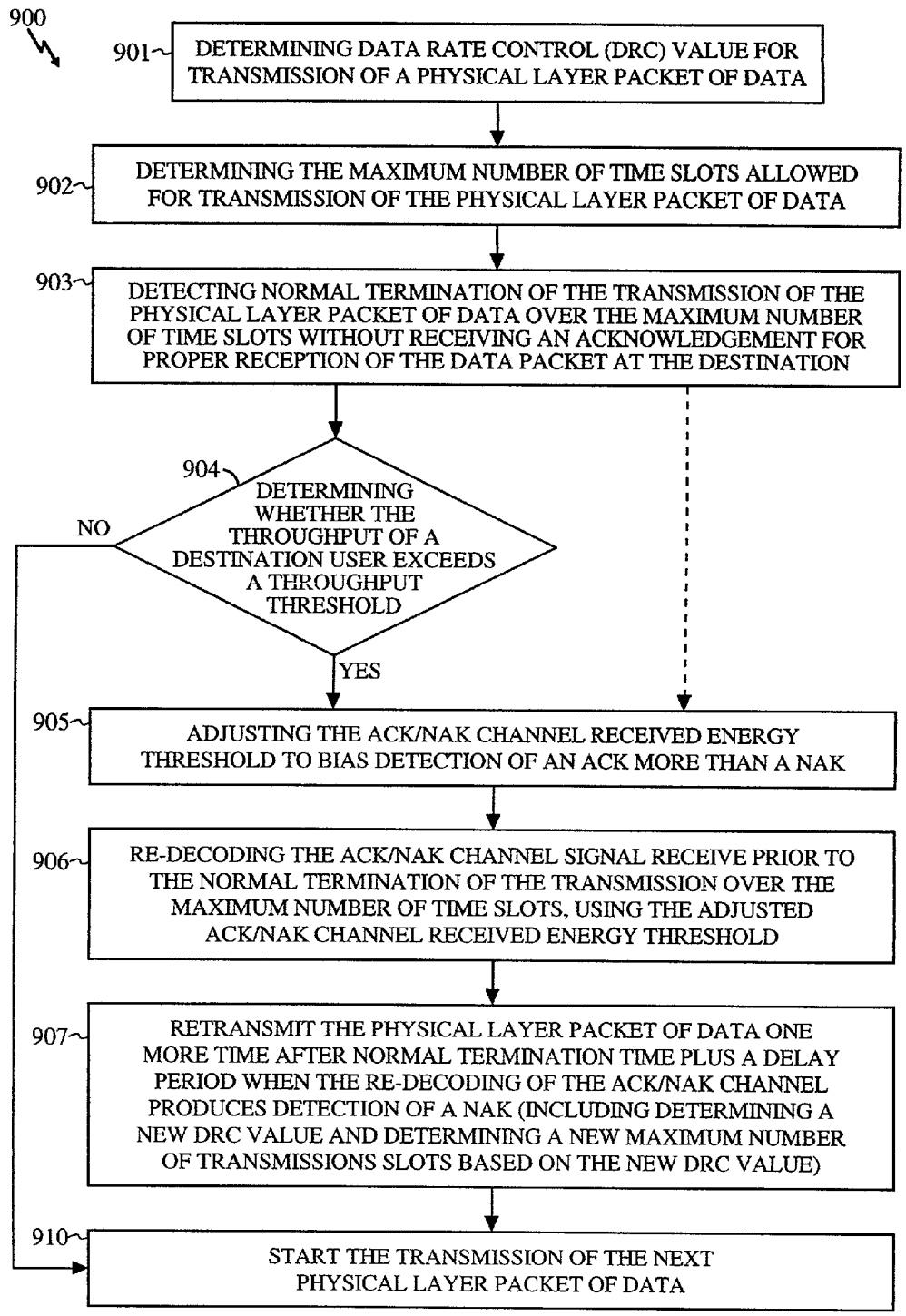
FIG. 9 illustrates a flow diagram of various steps for determining an extra retransmission of a physical layer packet of data in accordance with various aspects of the invention.

Various aspects of the invention may be more apparent by referring to flow diagram 900 shown in FIG. 9. At step 901, the transmitter may determine the DRC value for transmission of a physical layer packet of data. The DRC value may be determined by decoding the DRC channel 305. At step 902, the maximum number of time slots allowed for transmission of the physical layer packet of data may be determined by referring to table 600 in FIG. 6. At step 903, the transmitter may detect a normal termination of the transmission of the physical layer packet of data over the maximum number of allowed time slots without receiving a subsequent ACK on the ACK channel 340. At step 905, the ACK and NAK thresholds 401 and 402 may be adjusted to bias towards detection of an ACK message. At step 906, the signal of the previously received ACK channel 340 is re-decoded using the adjusted thresholds to determine the bit on the ACK channel 340. If the re-decoding produces a NAK bit, the physical layer packet of data is transmitted one more round, at step 907. This additional round of transmissions includes a number of transmissions up to maximum allowed slots according to table 600 in FIG. 6 depending on the requested DRC at the time of start of retransmission. At this time, the transmitter may determine a new DRC value by decoding the DRC channel 305 to determine the maximum number of time slots allowed for transmission of the physical layer packet of data. The channel condition may have changed during the process. The new round of transmissions may begin after some delay. The delay may be necessary to allow a de-correlation in the channel condition. When the de-correlation of the channel condition takes place, the probability that the transmission of physical packet of data is successful is higher. The new round of transmissions may be in accordance of a newly received DRC value; thus, the number of allowed retransmissions may be different in this round of transmissions. At step 910, the next physical layer packet of data is transmitted. The last retransmission at step 907 may arrive and be decoded at the destination properly, and possibly eliminating a need for re-transmitting an RLP packet of data. As such, a delayed ARQ (DARQ) at the physical layer is very helpful for efficient communications of data. Channel correlation simply means that if a packet got erased in a slot, it is quite likely that it would get erased again if it were retransmitted immediately. This is particularly a concern in slow fading channel conditions. Thus, it is necessary to temporally de-correlate the retransmission from the lost transmission. This implies that the retransmission should occur at the earliest time that allows sufficient channel de-correlation following the lost transmission. The "Delayed ARQ (DARQ)" is, therefore, used. Simulation studies indicate that a delay of 10 to 20 mSec is sufficient, while other delayed time periods are also possible, meets the requirements.

DARQ in accordance with various aspects of the invention may result in significant performance gains for high throughput users under some traffic conditions. The interactions between TCP and the lower layers in a system may result in significant throughput loss for some users under typical (1% packet error rate (PER)) operating conditions. This loss can be attributed to several factors. A forward link loss leading to a RLP retransmission causes a delay in the receipt of the TCP segment affected by the loss, as well as the subsequent TCP segments which were received, but could not be delivered immediately due to the sequential delivery requirement of RLP. This would delay the generation of TCP ACK at the receiver. When the lost packet is recovered due to RLP retransmission, a burst of packets would be delivered to the TCP layer, which would in turn generate a burst of TCP ACK, which may temporarily overload the reverse link. The end result is that the TCP sender may time out, and thus causing a retransmission of packets, which have been successfully received in the first place. Moreover, the congestion window at the TCP sender is reduced to its slow start value (typically one TCP segment) and can take some time to recover before a steady flow of packets can be achieved which may lead to "starvation" of the forward link.

The problems described above can be alleviated to a great degree, if an extra physical layer retransmission is performed on the forward link fairly quickly in accordance with various aspects of the invention. The extra retransmission provides additional robustness. The quickness of the retransmission will help in reducing the delay thus possibly eliminating the TCP sender timeout. Moreover, the quick retransmission will reduce the delay variability seen by the TCP sender, which may lead to improved performance. There are other by-products of such a scheme such as in the case when the last byte in a forward link transmission gets lost. Since this won't generate a NAK from the mobile, the base station maintains a flush timer to cause a forced retransmission. DARQ would result in an automatic retransmission in this case, and a flush timer may not be necessary.

Various aspects of the invention may be useful under many different system conditions, including high throughput condition. The high throughput condition occurs when the channel condition is very favorable for low error rate communications and possibly there are few users in the system. The additional retransmission may provide more gains for high throughput users than low throughput users. For low throughput users, it may result in extra overhead without any benefit. Therefore, to add an additional layer of control for various aspects of the invention, after step 903 and before step 905, the transmitter may determine the throughput of the user receiving the communication. If the throughput is above a throughput threshold, the process moves to step 905 to prepare for deciding whether one additional retransmission of the physical layer packet of data may take place.

Figure 10:
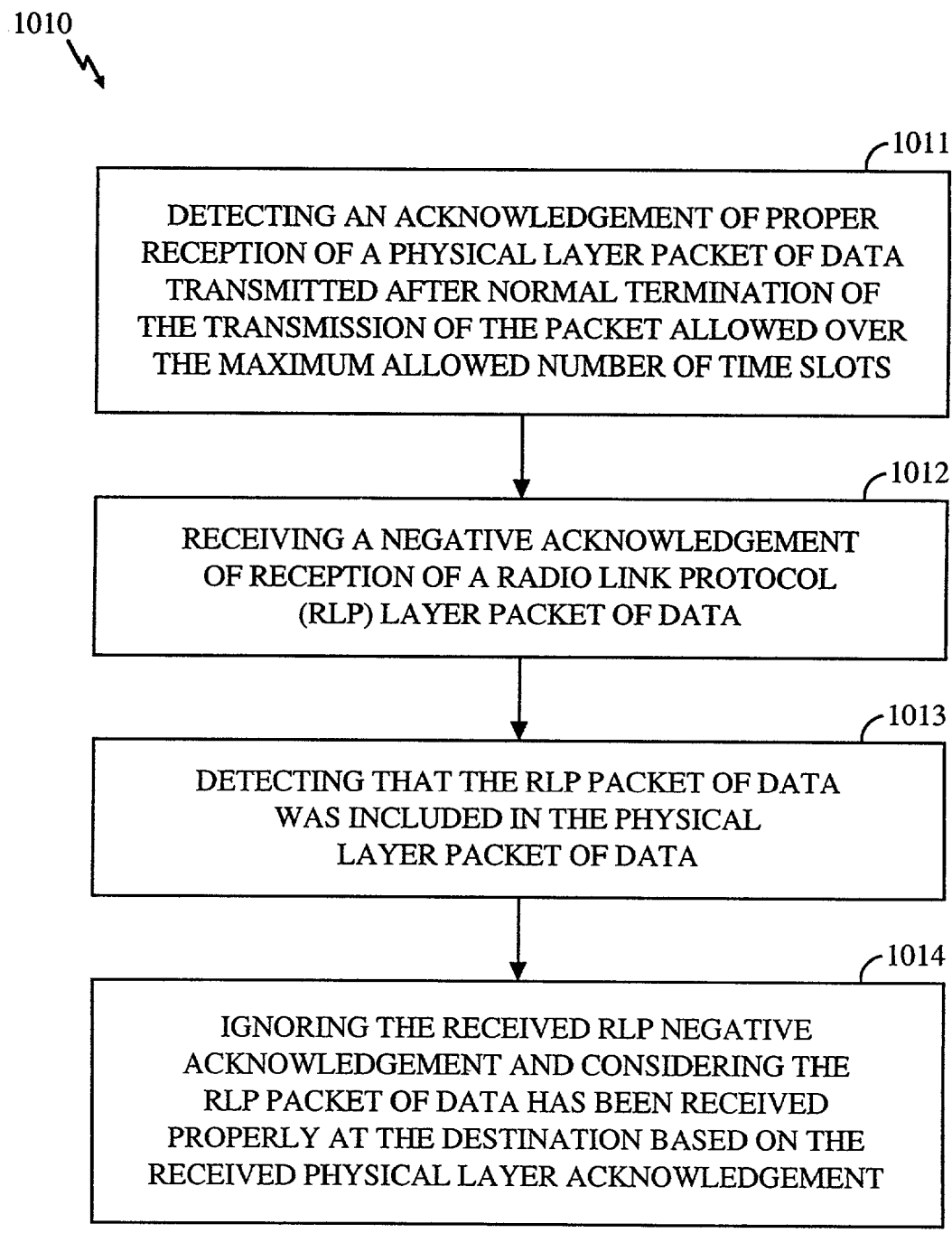
FIG. 10 illustrates a flow diagram of various steps for ignoring a radio link negative acknowledgment in accordance with various aspects of the invention.

After normal termination of transmitting the physical layer packet of data and before completing the extra transmission of the physical layer packet of data, the RLP layer 504 may start and transmit a RLP NAK message. If the RLP NAK message arrives along with an ACK indication on the ACK channel 340 for proper reception of the extra transmission made after the normal termination, the RLP NAK may be ignored in accordance with various aspects of the invention. Various aspects of the invention may be more apparent by referring to flow diagram 1010 shown in FIG. 10. At step 1011, an ACK on the ACK channel 340 is received. The ACK is related to the physical layer packet of data retransmitted after the failed normal termination of the first transmission. At step 1012, a RLP NAK message may also be received. The RLP NAK message may be associated with an RLP packet of data that was included in the physical layer packet of data. Such a detection may be made at step 1013. At step 1014, the received RLP NAK message may be ignored and the controller may consider the RLP packet of data received properly at the destination based on the received ACK bit on the ACK channel 340. The mobile station may delay transmitting the RLP NAK message after detecting that the last transmission of the physical layer packet of data should have taken place, and while not receiving the last transmission.

Figure 11:
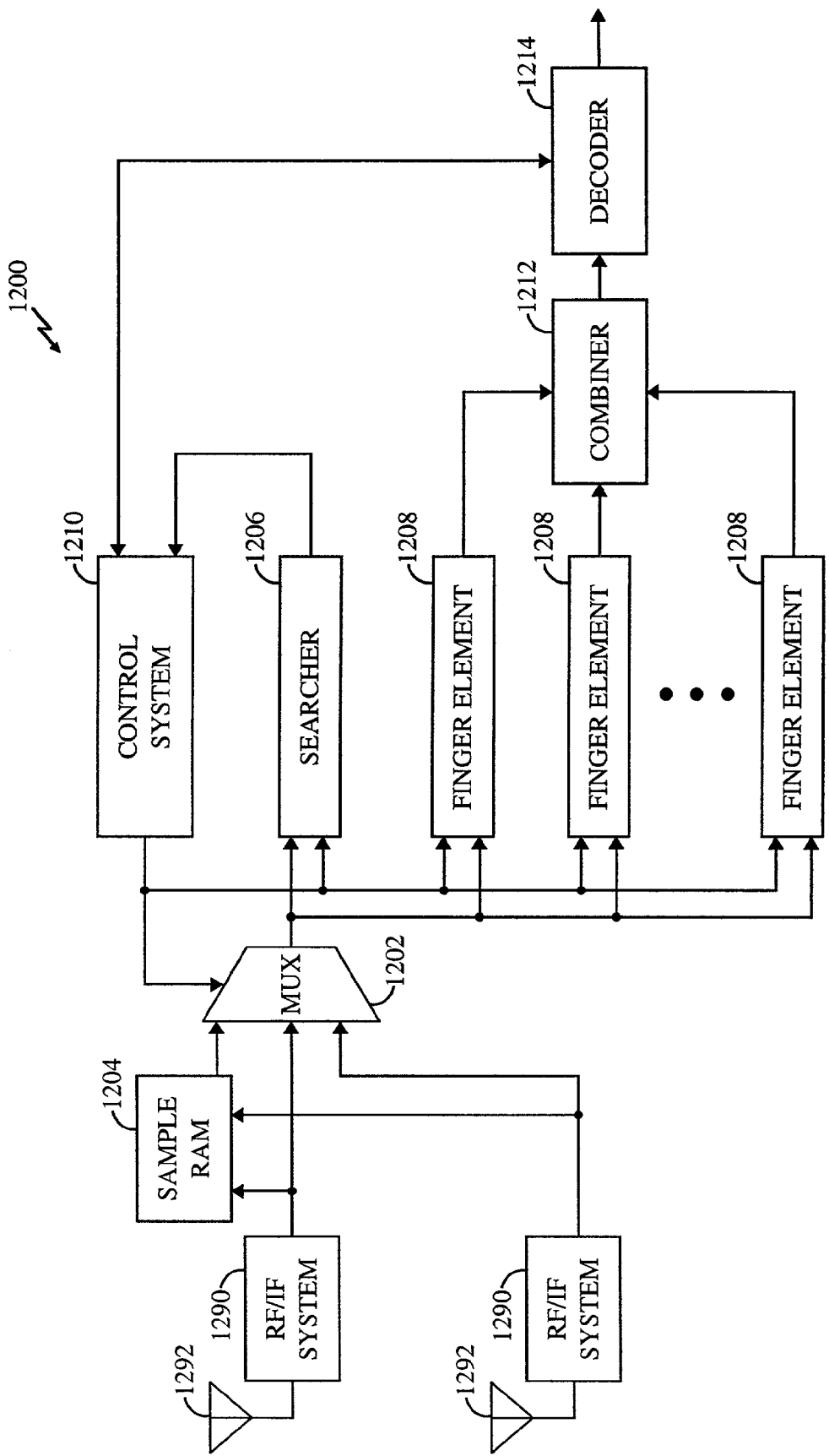
FIG. 11 illustrates a receiver system for receiving and decoding various channels, and capable of operating in accordance with various aspects of the invention.

FIG. 11 illustrates a block diagram of a receiver 1200 used for processing and demodulating the received CDMA signal. Receiver 1200 may be used for decoding the information on the reverse and forward links signals. Received (Rx) samples may be stored in RAM 1204. Receive samples are generated by a radio frequency/intermediate frequency (RF/IF) system 1290 and an antenna system 1292. The RF/IF system 1290 and antenna system 1292 may include one or more components for receiving multiple signals and RF/IF processing of the received signals for taking advantage of the receive diversity gain. Multiple received signals propagated through different propagation paths may be from a common source. Antenna system 1292 receives the RF signals, and passes the RF signals to RF/IF system 1290. RF/IF system 1290 may be any conventional RF/IF receiver. The received RF signals are filtered, down-converted and digitized to form RX samples at base band frequencies. The samples are supplied to a demultiplexer (demux) 1202. The output of demux 1202 is supplied to a searcher unit 1206 and finger elements 1208. A control unit 410 is coupled thereto. A combiner 1212 couples a decoder 1214 to finger elements 1208. Control system 1210 may be a microprocessor controlled by software, and may be located on the same integrated circuit or on a separate integrated circuit. The decoding function in decoder 1214 may be in accordance with a turbo decoder or any other suitable decoding algorithms.

During operation, received samples are supplied to demux 1202. Demux 1202 supplies the samples to searcher unit 1206 and finger elements 408. Control system 1210 configures finger elements 1208 to perform demodulation and despreading of the received signal at different time offsets based on search results from searcher unit 1206. The results of the demodulation are combined and passed to decoder 1214. Decoder 1214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 1200 may be used in a receiver portion of base stations 101 and 160 for processing the received reverse link signals from the mobile stations, and in a receiver portion of any of the mobile stations for processing the received forward link signals.

Figure 12:
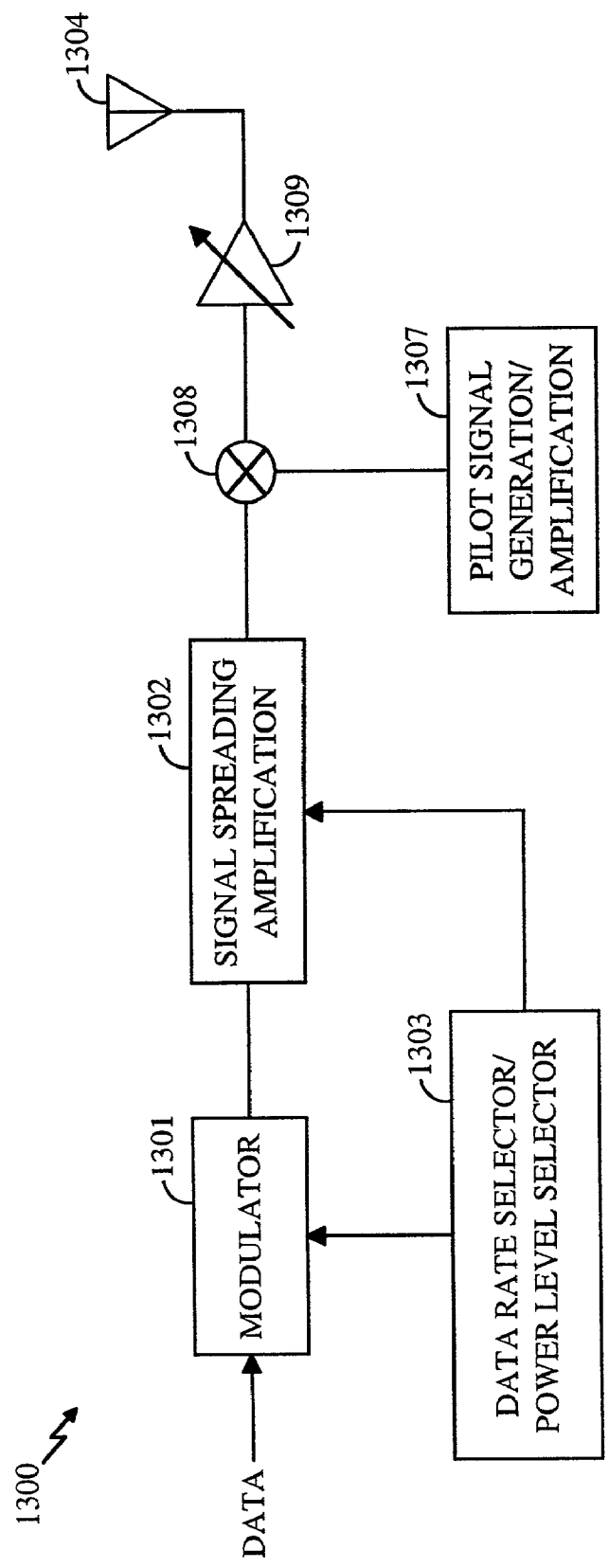
FIG. 12 illustrates a transmitter system for transmitting various channels, and capable of operating in accordance with various aspects of the invention.

FIG. 12 illustrates a block diagram of a transmitter 1300 for transmitting the reverse and forward link signals. The channel data for transmission are input to a modulator 1301 for modulation. The modulation may be according to any of the commonly known modulation techniques such as QAM, PSK or BPSK. The data is encoded at a data rate in modulator 1301. The data rate may be selected by a data rate and power level selector 1303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 1303 accordingly selects the data rate in modulator 1301. The output of modulator 1301 passes through a signal spreading operation and amplified in a block 1302 for transmission from an antenna 1304. The data rate and power level selector 1303 also selects a power level for the amplification level of the transmitted signal in accordance with the feedback information. The combination of the selected data rate and the power level allows proper decoding of the transmitted data at the receiving destination. A pilot signal is also generated in a block 1307. The pilot signal is amplified to an appropriate level in block 1307. The pilot signal power level may be in accordance with the channel condition at the receiving destination. The pilot signal is combined with the channel signal in a combiner 1308. The combined signal may be amplified in an amplifier 1309 and transmitted from antenna 1304. The antenna 1304 may be in any number of combinations including antenna arrays and multiple input multiple output configurations.

Figure 13:
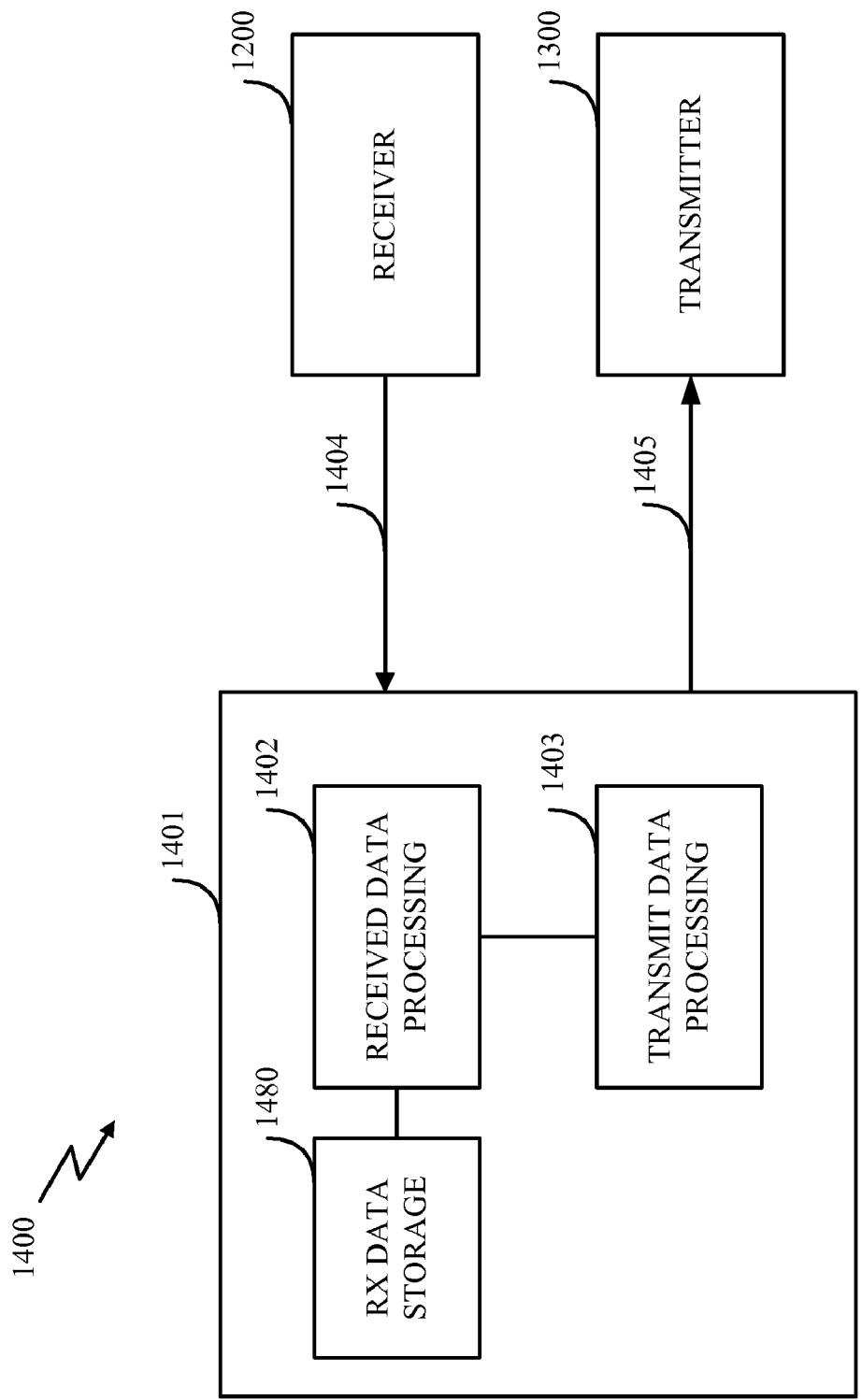
FIG. 13 illustrates a transceiver system for receiving and transmitting various channels, and capable of operating in accordance with various aspects of the invention.

FIG. 13 depicts a general diagram of a transceiver system 1400 for incorporating receiver 1200 and transmitter 1300 for maintaining a communication link with a destination. The transceiver 1400 may be incorporated in a mobile station or a base station. A processor 1401 may be coupled to receiver 1200 and transmitter 1300 to process the received and transmitted data. Various aspects of the receiver 1200 and transmitter 1300 may be common, even though receiver 1200 and transmitter 1300 are shown separately. In one aspect, receiver 1200 and transmitter 1300 may share a common local oscillator and a common antenna system for RF/IF receiving and transmitting. Transmitter 1300 receives the data for transmission on input 1405. Transmit data processing block 1403 prepares the data for transmission on a transmit channel. Received data, after being decoded in decoder 1214, are received at processor 1401 at an input 1404. Received data are processed in received data processing block 1402 in processor 1401. The processing of the received data generally includes checking for error in the received packets of data. For example, if a received packet of data has error at an unacceptable level, the received data processing block 1402 sends an instruction to transmit data processing block 1403 for making a request for retransmission of the packet of data. The request is transmitted on a transmit channel. Various channels, such as the ACK channel 340, may be used for the retransmission process. As such, the control system 1210 and processor 1401 may be used for performing various aspects of the invention including various steps described in relation to flow diagrams 900. A receive data storage unit 1480 may be utilized to store the received packets of data. Various operations of processor 1401 may be integrated in a single or multiple processing units. The transceiver 1400 may be connected to another device. The transceiver 1400 may be an integral part of the device. The device may be a computer or operates similar to a computer. The device may be connected to a data network, such as Internet. In case of incorporating the transceiver 1400 in a base station, the base station through several connections may be connected to a network, such as Internet.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for use in a communication system, comprising:
   establishing a communication link between a source user and a destination user;
   detecting loss of a packet of data communicated between said source and destination users;
   determining throughput of said communication link; and
   retransmitting said lost packet of data at least one more time after said detecting based on whether said determined throughput is above a throughput threshold, wherein said retransmitting is after exhausting a maximum allowed retransmissions, and wherein said maximum allowed retransmission is based on a data rate of communication between said source user and said destination user.

2. The method as recited in claim 1, wherein said retransmitting includes use of transmission diversity.

3. A station for use in a communication system, comprising:
   a controller and a transceiver system configured for establishing a communication link between a source user and a destination user, wherein said controller further is configured for detecting loss of a packet of data communicated between said source and destination users and determining throughput of said communication link, and said transceiver system farther is configured for retransmitting said lost packet of data at least one more time after said detecting based on whether said determined throughput is above a throughput threshold, wherein said retransmitting is after exhausting a maximum allowed retransmissions, and wherein said maximum allowed retransmission is based on a data rate of communication between said source user and said destination user.

4. The station as recited in claim 3, wherein said communication link is a forward link communication from said source user to said destination user, and wherein said destination user is a mobile station in said communication system.

5. The station as recited in claim 3, wherein said transceiver system is further configured for transmitting and receiving diversity of said retransmission of said lost packet of data.

6. A method in a communication system, comprising:
   establishing a communication link between a source user and a destination user;
   detecting, based on decoding an acknowledgment channel, loss of a packet of data communicated between said source and destination users after exhausting a maximum allowed retransmissions of said packet of data;
   adjusting decoding thresholds of an acknowledgment channel, and repeating decoding of said acknowledgment channel; and
   determining retransmission of said packet of data at least one more time based on said decoding of said acknowledgment channel with said adjusted thresholds.

7. The method as recited in claim 6, wherein said adjusting is biased for decoding a positive acknowledgment message.

8. The method as recited in claim 6, wherein said maximum allowed retransmission is based on a data rate of communication between said source user and said destination user.

9. A station in a communication system, comprising:
   a controller system and transceiver system configured for establishing a communication link between a source user and a destination user, for detecting, based on decoding an acknowledgment channel, loss of a packet of data communicated between said source and destination users after exhausting a maximum allowed retransmissions of said packet of data, for adjusting an acknowledgment channel decoding thresholds and repeating decoding of said acknowledgment channel, for determining retransmission of said packet of data at least one more time based on said decoding of said acknowledgment channel with said adjusted thresholds.

10. The station as recited in claim 9, wherein said adjusting is biased for decoding a positive acknowledgment message.

11. The station as recited in claim 9, wherein said maximum allowed retransmission is based on a data rate of communication between said source user and said destination user.

12. The station as recited in claim 9, wherein said transceiver system is further configured for transmitting and receiving diversity of said retransmitting said lost packet of data.

13. A method for use in a communication system, comprising:
   determining a data rate control (DRC) value for transmission of a physical layer packet of data from a base station to a mobile station;
   determining a maximum number of time slots allowed for transmission of said physical layer packet of data;
   detecting a normal termination of transmission of said physical layer packet of data over said maximum number of time slots without receiving, over an acknowledgment channel, at said base station, an acknowledgment for proper reception of said physical layer packet of data at said mobile station;
   adjusting decoding thresholds for decoding said acknowledgment channel to bias detection of a positive acknowledgment message more than detection of a negative acknowledgment message;
   repeating decoding of said acknowledgment channel with said adjusted decoding thresholds; and
   retransmitting said physical layer packet of data at least one more time after said detecting said normal termination of transmission based on whether said repeating decoding of said acknowledgment channel produces a negative acknowledgment message.

14. The method as recited in claim 13, further comprising:
   delaying said retransmitting said physical layer packet of data to allow for decorrelation of a channel between said mobile station and said base station.

15. The method as recited in claim 13, further comprising:
   determining a new DRC value and determining a new maximum number of transmission slots based on the new DRC value and limiting said retransmitting said physical layer packet of data to said new maximum number of transmission slots.

16. The method as recited in claim 13, further comprising:
   determining a throughput of communications between said base station and said mobile station, wherein said retransmitting is based on whether said determined throughput is above a throughput threshold.

17. The method as recited in claim 13, further comprising:
   detecting a positive acknowledgment of reception of said physical layer packet of data after said retransmitting said physical layer packet of data at said least one more time after said detecting said normal termination of transmission;
   receiving a radio link protocol layer negative acknowledgment for failure of reception of a radio link protocol layer packet of data;
   detecting said radio link protocol layer packet of data is included in said physical layer packet of data; and ignoring said received radio link protocol layer negative acknowledgment and considering said radio link protocol layer packet of data as properly received.

18. The method as recited in claim 13, further comprising:
detecting a positive acknowledgment of reception of said physical layer packet of data after said retransmitting said physical layer packet of data at said least one more time after said detecting said normal termination of transmission; and
delaying transmission of a radio link protocol layer negative acknowledgment for failure of reception of a radio link protocol layer packet of data to allow time for said detecting.

19. A station for use in a communication system, comprising:
a control and transceiver system configured for determining a data rate control (DRC) value for transmission of a physical layer packet of data from a base station to a mobile station, for determining a maximum number of time slots allowed for transmission of said physical layer packet of data, for detecting a normal termination of transmission of said physical layer packet of data over said maximum number of time slots without receiving, over an acknowledgment channel, at said base station, an acknowledgment for proper reception of said physical layer packet of data at said mobile station, for adjusting decoding thresholds for decoding said acknowledgment channel to bias detection of a positive acknowledgment message more than detection of a negative acknowledgment message, for repeating decoding of said acknowledgment channel with said adjusted decoding thresholds, and for retransmitting said physical layer packet of data at least one more time after said detecting said normal termination of transmission based on whether said repeating decoding of said acknowledgment channel produces a negative acknowledgment message.

20. The station as recited in claim 19, wherein said control and transceiver system further configured for delaying said retransmitting said physical layer packet of data to allow for decorrelation of a channel between said mobile station and said base station.

21. The station as recited in claim 19, wherein said control and transceiver system further configured for determining a new DRC value and determining a new maximum number of transmission slots based on the new DRC value and limiting said retransmitting said physical layer packet of data to said maximum number of transmission slots.

22. The station as recited in claim 19, wherein said control and transceiver system further configured for determining a throughput of communications between said base station and said mobile station, wherein at said retransmitting is based on whether said determined throughput is above a throughput threshold.

23. The station as recited in claim 19, wherein said control and transceiver system further configured for detecting a positive acknowledgment of reception of said physical layer packet of data after said retransmitting said physical layer packet of data at least one more time after said detecting said normal termination of transmission, for receiving a radio link protocol layer negative acknowledgment for failure of reception of a radio link protocol layer packet of data, for detecting said radio link protocol layer packet of data is included in said physical layer packet of data, and for ignoring said received radio link protocol layer negative acknowledgment and considering said radio link protocol layer packet of data as properly received.

24. The station as recited in claim 19, wherein said control and transceiver system further configured for detecting a positive acknowledgment of reception of said physical layer packet of data after said retransmitting said physical layer packet of data at said least one more time after said detecting said normal termination of transmission, for receiving a radio link protocol layer negative acknowledgment for failure of reception of a radio link protocol layer packet of data, for detecting said radio link protocol layer packet of data is included in said physical layer packet of data, and for ignoring said received radio link protocol layer negative acknowledgment and considering said radio link protocol layer packet of data as properly received.

25. The station as recited in claim 19, wherein said control and transceiver system further configured for detecting a positive acknowledgment of reception of said physical layer packet of data after said retransmitting said physical layer packet of data at said least one more time after said detecting said normal termination of transmission, and for delaying transmission of a radio link protocol layer negative acknowledgment for failure of reception of a radio link protocol layer packet of data to allow time for said detecting.

26. A computer-readable medium including processor-executable instructions for performing a method for use in a communication system, the method comprising the steps of:
establishing a communication link between a source user and a destination user;
detecting loss of a packet of data communicated between said source and destination users;
determining throughput of said communication link; and
retransmitting said lost packet of data at least one more time after said detecting based on whether said determined throughput is above a throughput threshold, wherein said retransmitting is after exhausting a maximum allowed retransmissions, and wherein said maximum allowed retransmission is based on a data rate of communication between said source user and said destination user.

* * * * *

UNITED STATES PATENT AND TRADEMARK OFFICE
CERTIFICATE OF CORRECTION

PATENT NO. : 7,684,329 B2  
APPLICATION NO. : 10/140087  
DATED : March 23, 2010  
INVENTOR(S) : Mohanty et al.

Page 1 of 1

It is certified that error appears in the above-identified patent and that said Letters Patent is hereby corrected as shown below:

Column 15, line 27, claim 3: "farther" to read as --further--

Column 15, line 50, claim 6: "an acknowledgment channel" to read as --said acknowledgment channel--

Column 16, line 1, claim 9: "an acknowledgment channel" to read as --said acknowledgment channel--

Column 17, line 52, claim 22: "wherein at said" to read as --wherein said--

Signed and Sealed this  
Thirteenth Day of September, 2011

David J. Kappos  
*Director of the United States Patent and Trademark Office*